United States Patent
Spiegel et al.

(10) Patent No.: US 6,629,079 B1
(45) Date of Patent: Sep. 30, 2003

(54) METHOD AND SYSTEM FOR ELECTRONIC COMMERCE USING MULTIPLE ROLES

(75) Inventors: Joel R. Spiegel, Woodinville, WA (US); Maryam Mohit, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

(21) Appl. No.: 09/104,942

(22) Filed: Jun. 25, 1998

(51) Int. Cl.$^7$ ................................................. G06F 17/60

(52) U.S. Cl. ............................. 705/26; 705/27; 707/3; 707/10

(58) Field of Search .................... 705/26, 27; 707/3, 707/10

(56) References Cited

U.S. PATENT DOCUMENTS

| | | | | |
|---|---|---|---|---|
| 4,996,642 A | * | 2/1991 | Hey | 705/27 |
| 5,664,110 A | | 9/1997 | Green et al. | 705/26 |
| 5,710,887 A | * | 1/1998 | Chelliah et al. | 705/26 |
| 5,745,096 A | | 4/1998 | Ludolph et al. | 345/120 |
| 5,745,681 A | * | 4/1998 | Levine et al. | |
| 5,905,973 A | * | 5/1999 | Yonezawa et al. | 705/27 |
| 5,960,411 A | * | 9/1999 | Hartman et al. | 705/26 |
| 5,970,474 A | * | 10/1999 | LeRoy et al. | 705/27 |
| 6,092,049 A | * | 7/2000 | Chislenko et al. | 705/10 |
| 6,125,353 A | * | 9/2000 | Yagasaki | 705/27 |
| 6,289,322 B1 | * | 9/2001 | Kitchen et al. | 705/34 |
| 6,292,789 B1 | * | 9/2001 | Schutzer | 705/34 |

FOREIGN PATENT DOCUMENTS

| | | |
|---|---|---|
| EP | 0 798 655 A | 10/1997 |
| JP | 10105599 | 4/1998 |
| WO | WO9702537 | 1/1997 |
| WO | WO9740446 A | 10/1997 |

OTHER PUBLICATIONS

Baron, Chris, "Electronic Commerce With SoftCart," Web Techniques, Oct. 1996.
Hoque, Reaz, "Shopping Cart Application with JavaScript," Web Technique, vol. 3, May 1998.
Little, Thomas, D.C., "Commerce on the Internet," IEEE Multimedia, vol. 1, No. 4, Jan. 1994.
Gallagher, Katherine and Jeffrey Parsons, "A Framework for Targeting Banner Advertising on the Internet," Proceedings of the Thirtieth Hawaii International Conference on System Sciences, vol. 4, pp. 265–274, Jan. 7–10, 1997.

(List continued on next page.)

Primary Examiner—Vincent Millin
Assistant Examiner—Jagdish N Patel
(74) Attorney, Agent, or Firm—Perkins Coie LLP

(57) ABSTRACT

A computer system for conducting electronic commerce. The system provides multiple electronic shopping carts for each user. Each electronic shopping cart has an indication of items currently within the electronic shopping cart and billing and shipment information. The system generates a display that identifies each of the electronic shopping carts and sends the generated display to a user computer system. The system then receives a selection of one of the identified electronic shopping carts from the user computer system and receives a selection of an item from the user computer system. In response to receiving the selection of the item, the system adds the item to the selected electronic shopping cart. The system then receives an indication to checkout the items in the selected electronic shopping cart from the user computer system. In response to receiving the indication to checkout, the system ships the items in the selected electronic shopping cart in accordance with the shipment information of the selected electronic shopping cart and bills for the items in the selected electronic shopping cart in accordance with the billing information for the selected electronic shopping cart. The system thus allows a user to select each of the electronic shopping carts for adding items to each electronic shopping cart.

59 Claims, 11 Drawing Sheets

OTHER PUBLICATIONS

Tilson, Roger. et al., "A Comparison of Two Current E–Commerce Sites," Sixteenth Annual International Conference of Computer Documentation. Conference Proceedings, Scaling the Heights: Future of Information Technology, Proceedings of ACM SIGDOC 1988 Conference, pp. 87–92, Sep. 23–26, 1998.
http://www.netgrocer.com/[Sheet 1, accessed 3:52 p.m.].
http://www.netgrocer.com/ [Sheet 2, accessed 4:21 p.m.].
http://www.netgrocer.com/ [Sheet 3, accessed 4:20 p.m.].
http://www.netgrocer.com/ [Sheet 4, accessed 4:19 p.m.].
http://www.netgrocer.com/ [Sheet 5, accessed 4:17 p.m.].
http://www4.netgrocer.com/help.cfm?title+Selecting [Accessed Jun. 24, 1998].
http://www.4.netgrocer.com/help.cfm?title=Searching [Accessed Jun. 24, 1998].
http://www4.netgrocer.com/help.dfv?title=recurring [Accessed Jun. 24, 1998].
http:///4.netgrocer.com/help.cfm?title=Netrewards [Accessed Jun. 24, 1998].
http://www4.netgrocer.com/help.cfm?title=Service [Accessed Jun. 24, 1998].
http://www4.netgrocer.com/help.cfm?title=Shopper [Accessed Jun. 24, 1998].
http://www4.netgrocer.com/help.cfm?title=Cart [Accessed Jun. 24, 1998].
http://www4.netgrocer.com/help.cfm?title=lists [Accessed Jun. 24, 1998].
http://www4.netgrocer.com/help.cfm?title=Grocer [Accessed Jun. 24, 1998].
http://www4.netgrocer.com/help.cfm?title=Checkout [Accessed Jun. 24,1998].
http://www4.netgrocer.com/help.cfm?title=Payment [Accessed Jun. 24, 1998].
http://www4.netgrocer.com/help.cfm?title+Delivery [Accessed Jun. 24, 1998].
http://www4.netgrocer.com/shop_list_details.cfm?basket_id=3240024&detail=1 [Accessed Jun. 24, 1998].
http://www4.netgrocer.com/help.cfm?title=Security [Accessed Jun. 24, 1998].
http://www4.netgrocer.com/help.cfm?title=Schedule [Accessed Jun. 24, 1998].
http://www.4netgrocer.com/help.cfm?title=Reschedule [Accessed Jun. 24, 1998].

* cited by examiner

User Table

| USER ID | NAME | E-MAIL | . . . |
|---|---|---|---|
| J. Smith | Smith, J. | jsmith@... | |
| J. Doe | Doe, J. | jdoe@... | |
| • | | | |
| • | | | |
| • | | | |

501

Context Mapping Table

| USER ID | CONTEXT ID |
|---|---|
| J. Smith | 204 |
| J. Smith | 220 |
| J. Doe | 229 |
| J. Doe | 205 |
| J. Doe | 175 |
| • | • |
| • | • |
| • | • |

Context Table

| CONTEXT ID | NAME | ADDRESS | . . . |
|---|---|---|---|
| 175 | Work | 4215... | |
| 204 | Johnny's | | |
| 205 | Fiction | | |
| 220 | Mother-in-law | | |
| 229 | Non-fiction | | |
| • | • | | |
| • | • | | |
| • | • | | |

503

METHOD AND SYSTEM FOR ELECTRONIC COMMERCE USING MULTIPLE ROLES

TECHNICAL FIELD

The present invention relates to a computer method and system of electronic commerce and, more particularly, to a method and system for selecting items to order using a "shopping cart" model.

BACKGROUND OF THE INVENTION

The Internet is increasingly being used to conduct "electronic commerce," because it comprises a vast number of computers and computer networks that are interconnected through communication links which facilitates electronic communications between vendors and purchasers. Electronic commerce refers generally to commercial transactions that are at least partially conducted using the computer systems of the parties to the transactions. For example, a purchaser can use a personal computer to connect via the Internet to a vendor's computer. The purchaser can then interact with the vendor's computer to conduct the transaction. Although many of the commercial transactions that are performed today could be performed via electronic commerce, the acceptance and wide-spread use of electronic commerce depends, in large part, upon the ease-of-use of conducting such electronic commerce. If electronic commerce can be easily conducted, then even the novice computer user will choose to use electronic commerce. Therefore, it is important that techniques be developed to facilitate conducting electronic commerce.

The Internet provides a network that facilitates conducting electronic commerce because it uses standardized techniques for exchanging information.

Many standards have been established for exchanging information over the Internet, such as electronic mail, Gopher, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a client computer system specifies the URL for that Web page in a request (e.g., a HyperText Transfer Protocol ("HTTP") request). The request is forwarded to the Web server that supports that Web page. When that Web server receives the request, it sends that Web page to the client computer system. When the client computer system receives that Web page, it typically displays the Web page using a browser. A browser is typically a special-purpose application program that effects the requesting of Web pages and the displaying of Web pages.

Currently, Web pages are generally defined using HyperText Markup Language ("HTML"). HTML provides a standard set of tags that define is how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

The World Wide Web portion of the Internet is especially conducive to conducting electronic commerce. Many Web servers have been developed through which vendors can advertise and sell product. The products can include items (e.g., music) that are delivered electronically to the purchaser over the Internet and items (e.g., books) that are delivered through conventional distribution channels (e.g., a common carrier). A server computer system may provide an electronic version of a catalog that lists the items that are available. A user, who is a potential purchaser, may browse through the catalog using a browser and select various items that are to be purchased. When the user has completed selecting the items to be purchased, the server computer system then prompts the user for information to complete the ordering of the items. This purchaser-specific order information may include the purchaser's name, the purchaser's credit card number, and a shipping address for the order. The server computer system then typically confirms the order by sending a confirming Web page to the client computer system and schedules shipment of the items.

The selection from the electronic catalogs of items to be purchased is generally based on a "shopping cart" or "shopping basket" model. When the purchaser selects an item, the server computer system metaphorically adds that item to a shopping cart. The server computer system provides Web pages that allow the purchaser to view and change the quantities of the items in the shopping cart. When the purchaser is satisfied with the items in the shopping cart, the purchaser "checks out" the items that are in the shopping cart. The purchaser may provide billing and shipment information as part of "check out"process. When check out is complete, the items are then shipped in accordance with the shipment information, and the purchaser is billed in accordance with the billing information.

Although the shopping cart model facilitates the purchasing of items via electronic commerce, purchasing items via electronic commerce can still be cumbersome. First, a single purchaser may use different billing and shipment information at different times. For example, when purchasing items for use in the workplace, the purchaser may use a company credit card and the company's shipping address. In contrast, when purchasing items for personal use, the purchaser may use a personal credit card and a home address for shipping. It may be cumbersome to re-enter such information or re-select such information when the purchaser is purchasing for workplace or home use. Second, server computer systems may customize recommendations for items to purchase based on the purchasing or, more generally, access patterns of a user. For example, if a user generally purchases books relating to current politics, then when the user next connects to the server computer system, it may recommend that the user purchase a recently released book on current politics. However, if the purchaser purchases different types of items at work from the types of items purchased at home, then the server computer system may make inappropriate recommendations at certain times. For example, the server computer system may recommend a book on current politics when the user is at work looking for books on computer software.

SUMMARY OF THE INVENTION

Embodiments of the present invention provide a method and system for conducting electronic commerce with multiple electronic commerce contexts and more generally for interacting with a computer system with multiple interaction contexts. The electronic commerce system embodiment provides multiple electronic commerce contexts (e.g., "shopping carts") for each user. Each electronic commerce context has associated information relating to electronic commerce conducted while the user was in that electronic commerce context. The electronic commerce system receives from the user a selection of one of the electronic commerce contexts. After receiving the selection of the one of the electronic commerce contexts, the electronic commerce system conducts electronic commerce with the user. The electronic commerce system associates, with the selected electronic commerce context, information relating to the electronic commerce conducted with the user so that when the user subsequently selects that electronic commerce context, the associated information is available for conducting subsequent electronic commerce. In this way, a user can use various electronic commerce contexts without having to re-specify information (e.g., billing information) relating to the various electronic commerce contexts.

In one embodiment, the electronic commerce system uses a multiple shopping cart model for each user conducting electronic commerce. Each shopping cart is intended to be used when a user is purchasing items in a different "role" or different electronic commerce context. For example, one shopping cart can be used when the user is acting in a workplace role purchasing items for work, and another shopping cart can be used when the user is acting in a personal role purchasing items for personal use. The electronic commerce system allows the user to select the shopping cart that is appropriate for the user's current role. As the user selects items to be purchased, the electronic commerce system adds the items to the currently selected shopping cart. Each shopping cart has associated with it information that is related to the role that the user is in when the shopping cart is used. This information may include billing and shipment information. In this way, when a user conducts electronic commerce in different roles, the user can select the shopping cart that already has the appropriate billing and shipment information. In addition, the electronic commerce system can track the electronic commerce activity of the user in each separate role (i.e., each shopping cart) and customize advertising and recommendations based on activity performed while the user was in that role.

BRIEF DESCRIPTION OF THE DRAWINGS

FIG. 5 is a block diagram illustrating a sample data structure for storing electronic commerce context ("ECC") profile information.

DETAILED DESCRIPTION OF THE INVENTION

Figure 1:
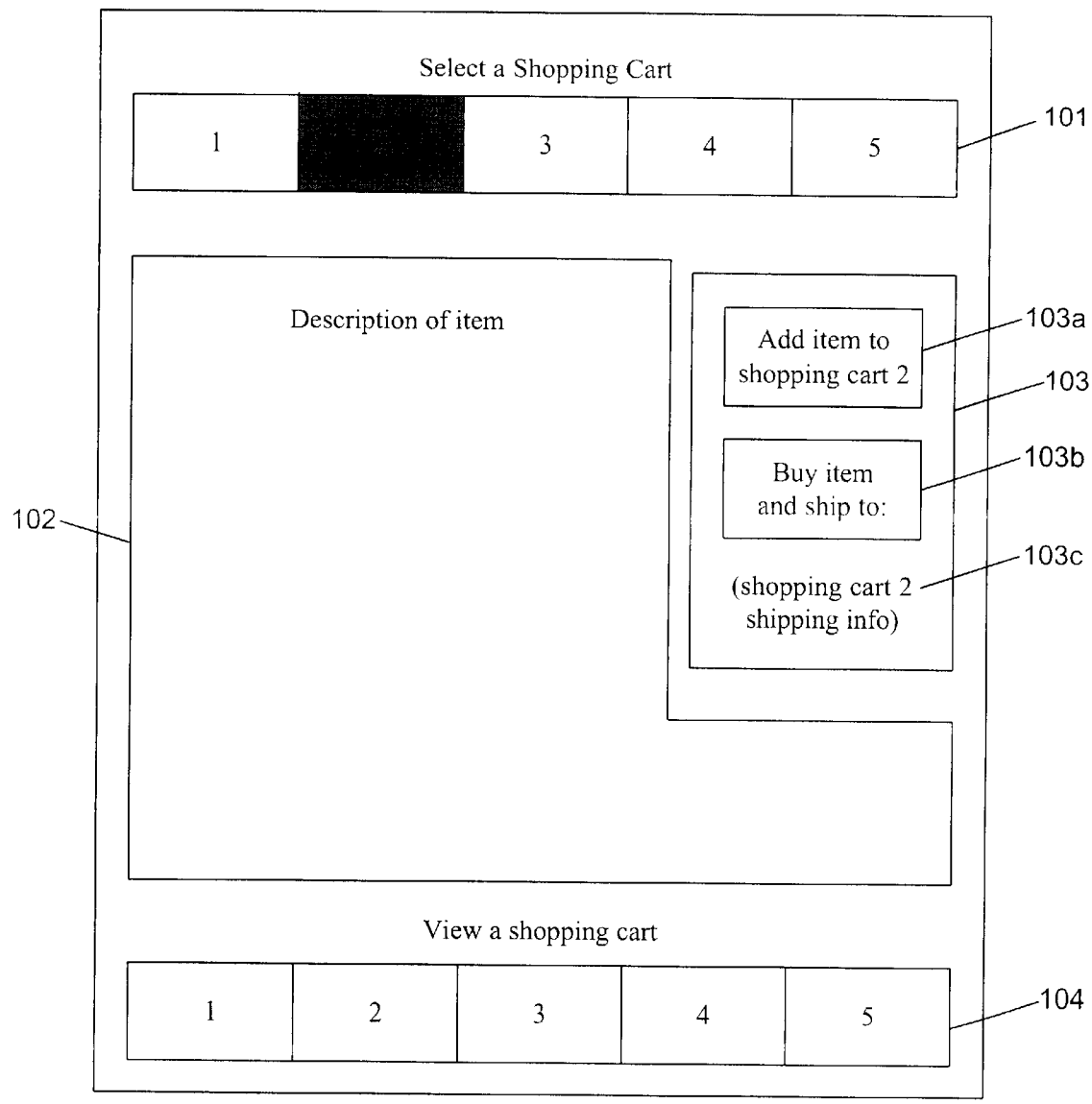
FIG. 1 is a diagram of the display illustrating the use of a shopping cart for each electronic commerce context.

An embodiment of the present invention provides a method and system that uses a multiple shopping cart model for each user conducting electronic commerce. Each shopping cart is intended to be used when a user is purchasing items in a different "role." For example, one shopping cart can be used when the user is acting in a workplace role purchasing items for work, and another shopping cart can be used when the user is acting in a personal role purchasing items for personal use. The system of the present invention allows the user to select the shopping cart that is appropriate for the user's current role. As the user selects items to be purchased, the system adds the items to the currently selected shopping cart. Each shopping cart has associated with it information that is related to the role that the user is in when the shopping cart is used. This information may include billing and shipment information. When a user conducts electronic commerce in different roles, the user can select the shopping cart that already has the appropriate billing and shipment information. In this way, the user can avoid having to re-specify billing and shipping information that is unique to a certain role. In addition, the system can track the electronic commerce activity of the user in each separate role (i.e., each shopping cart) and customize advertising and recommendations based on activity performed while the user was in that role.

In one embodiment, the system of the present invention provides a shopping cart selection navigation bar that allows the user to switch between shopping carts using a single action (e.g., a mouse click). The use of single-action switching between shopping carts greatly facilitates conducting the electronic commerce. The selection navigation bar has an area associated with each shopping cart. In one embodiment, the system displays the shopping cart selection navigation bar at the top of various displays (e.g., Web pages), such as a display that describes an item that can be purchased. By performing the single action, the user can quickly switch between separate shopping carts. When the user indicates to add an item to a shopping cart, the system adds the item to the currently selected shopping cart. A user may use the shopping cart selection navigation bar to conveniently place an item in multiple shopping carts. For example, if the user is purchasing items for, say, five relatives, then the user can set up one shopping cart for each relative. In such an example, each shopping cart will have shipment information for one of the relatives. When the selection navigation bar is displayed along with a description of an item, the user can select a shopping cart and then add the item to that shopping cart. The user can then select the next shopping cart and add the item to that shopping cart. This process of selecting and adding can be performed for each shopping cart. In this way, items can be added to multiple shopping carts with only two actions (e.g., two mouse clicks), that is, one action to select the shopping cart and one action to add the item to the currently selected shopping cart.

The system of the present invention also provides a shopping cart viewing navigation bar through which a user can select to view information relating to a certain shopping cart. When a shopping cart is selected from the viewing navigation bar, the system displays information describing the current contents of the selected shopping cart, information describing past orders that were checked out of that shopping cart, context naming information (e.g., suggestive of the role for which the shopping cart is used), and billing and shipment information. The user can then modify the contents of the shopping cart, check out the contents of the shopping cart, or update the information relating to the shopping cart. Alternatively, rather than having a separate viewing navigation bar that lists each shopping cart, a single button can be provided through which the user can view information relating to the currently selected shopping cart.

The system of the present invention is referred to as the multiple electronic commerce context system ("MECC" system) (or multiple shopping cart system in one embodiment) because each different role represents a different electronic commerce context in which a user conducts electronic commerce. In one embodiment, the MECC system uses a separate shopping cart for each electronic commerce context. However, one skilled in the art will appreciate that the principles of multiple electronic commercial contexts can be used independent of the shopping cart model. In general, each context can be considered to include an aggregation (e.g., items selected to purchase) and information relating to the aggregation (e.g., billing information). Different metaphors can be used to refer to the aggregations depending on the type of electronic commerce being conducted. For example, if the electronic commerce is the purchasing of books, then the aggregations may be referred to as separate "bookshelves" rather than shopping carts. In another example, the metaphor of "CD bins" may be used when the electronic commerce involves purchasing CDs. The MECC system allows a user to name each electronic commerce context so that the user can easily identify the electronic commerce contexts. For example, the user may name one of the electronic commerce contexts "Johnny's books," if the user uses that context to purchase books for Johnny. The MECC system also stores electronic commerce context ("ECC") profile information for each context. The ECC profile information includes information describing the contents of the shopping cart associated with that context, describing past orders submitted while in that context, and describing past activity electronic commerce activity while in that context.

FIG. 1 is a diagram of the display illustrating the use of a shopping cart for each electronic commerce context. The display includes the shopping cart selection navigation bar 101, item detailed description 102, selection box 103, and shopping cart viewing navigation bar 104. The selection navigation bar contains an area for each of five shopping carts or electronic commerce contexts. Each shopping cart is currently identified by a number between one and five. The shopping cart identified by numbered 2 is currently selected as indicated by shading. The item detailed description contains information describing the item currently selected by the user. This information may include pricing data, availability data, and a general description of the item. The selection box contains an add-to shopping cart button 103a and single-action ordering button 103b. The use of single-action ordering is described in U.S. patent application Ser. No. 08/928,951 entitled "Method and System for Placing a Purchase Order Via a Communications Network," which is hereby incorporated by reference. The text 103c contains shipment information for the currently selected shopping cart as a reminder to the user. The viewing navigation bar contains an area for each shopping cart. Initially, it may be that no shopping carts or only one shopping cart has been defined. In which case, the selection navigation bar may be initially not displayed or displayed with one area. As a user dynamically adds and deletes shopping carts, the selection navigation bar is adjusted accordingly.

When a user selects a shopping cart from the selection navigation bar, the selected shopping cart becomes the current shopping cart, which changes the electronic commerce context. The information in the selection box is updated each time a different shopping cart is selected to reflect the currently selected shopping cart. When a user selects the add-to shopping cart button, the currently selected item is added to the currently selected shopping cart. When a user selects the single-action ordering button, an order is automatically placed for the currently selected item. That item is shipped and billed according to the shipment and billing information of the currently selected shopping cart. A user may view and update information relating to a shopping cart by selecting a shopping cart from the viewing navigation bar. Alternatively, the viewing navigation bar may be replaced by a single button that when selected allows the user to view and update information for the currently selected shopping cart.

Figure 2:
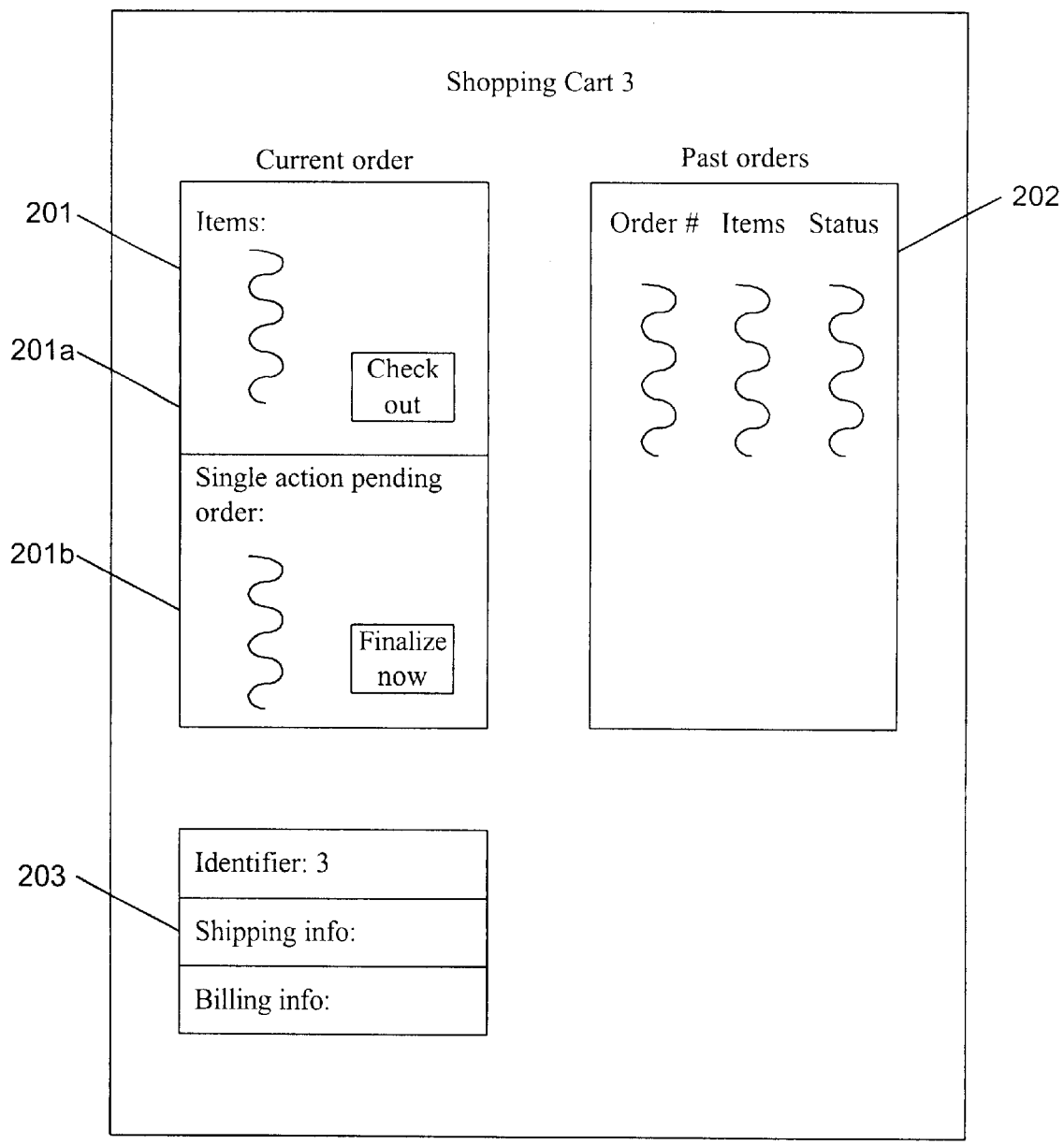
FIG. 2 is a diagram illustrating the display of shopping cart information.

FIG. 2 is a diagram illustrating the display of shopping cart information. The display contains a current order box 201, the past order box 202, and a general information box 203. The current order box contains information relating to items currently in the shopping cart that have not yet been checked out. The shopping cart sub-box 201a contains a listing of the items currently in the shopping cart. The user may modify the current order by changing the quantities of the items. The user places the order by selecting the check-out button within the shopping cart sub-box. When the current order is checked out, it becomes a past order and status information is displayed in the past orders box. The single-action pending order sub-box 201b contains a list of the items that have been selected using single-action ordering, but have not yet been finalized. Items selected using the single-action ordering technique are automatically finalized after a predetermined time (e.g., 60 minutes). Before that predetermined time has expired, the user may change the order or manually finalize the order using the "finalize now" button in the single-action pending order sub-box. Once the single-action order is checked out, it becomes a past order and status and information is displayed in the past orders box. The general information box contains information pertaining to the shopping cart. In this example, the information includes a user-changeable identifier field, shipping field, and billing field. The user can change the identifier, which defaults to numeric value, to text that is more meaningful to the user. For example, the user may change the identifier to the text "Johnny's books" if that shopping cart is used by the user to purchase books for Johnny.

Figure 3:
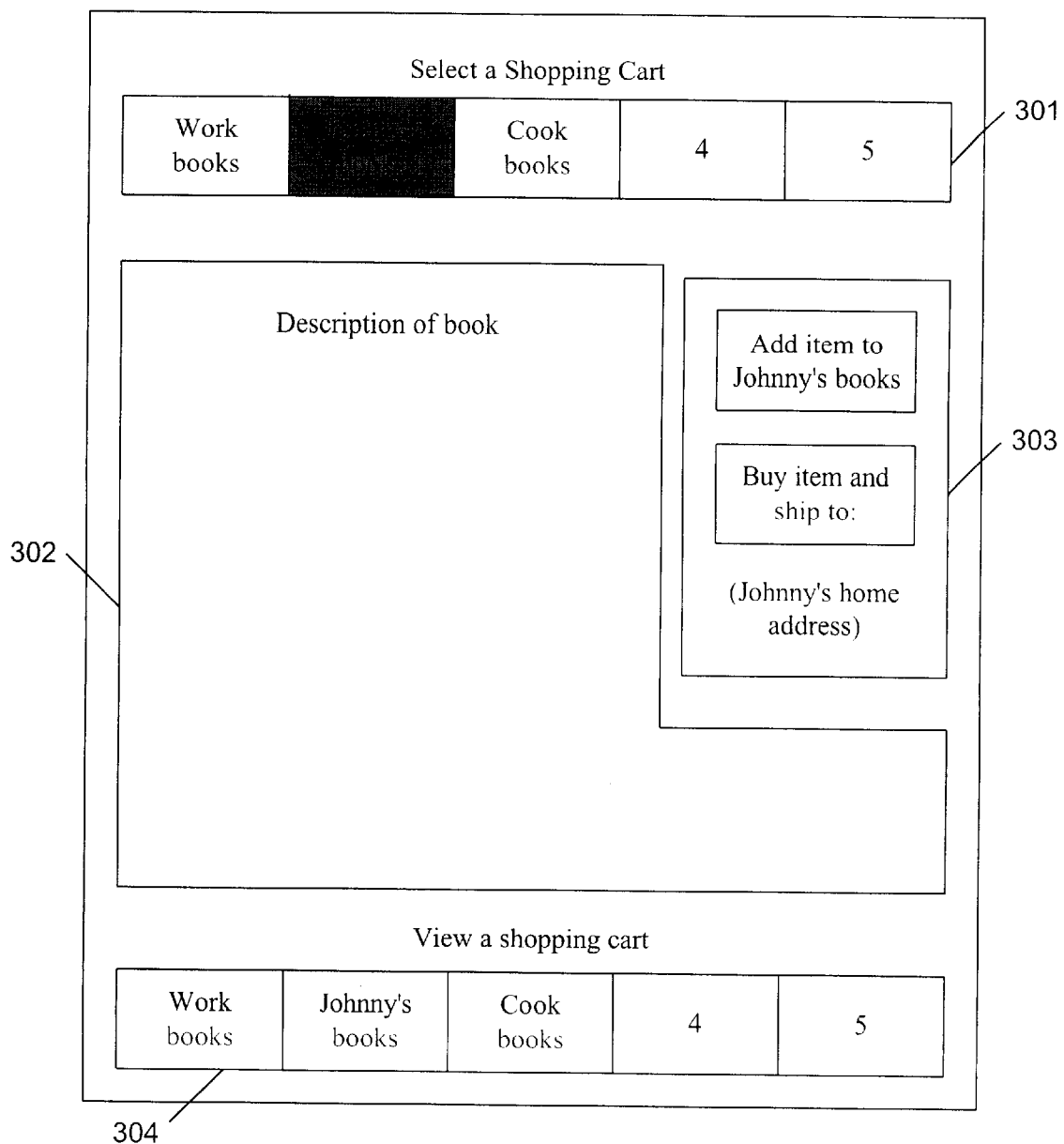
FIG. 3 is a diagram illustrating the display after a user has modified information relating to some of the shopping carts.

FIG. 3 is a diagram illustrating the display after a user has modified information relating to some of the shopping carts. In this example, the shopping cart selection navigation bar 301 indicates that the first three shopping carts have the identifiers "work books," "cookbooks," and "Johnny's books,"respectively. The user has not modified the default identifier for shopping carts 4 and 5. The shopping cart viewing navigation bar 304 also indicates the updated identifiers. The information in the selection box 303 contains information relating to the currently selected shopping cart—"Johnny's books."

Figure 4:
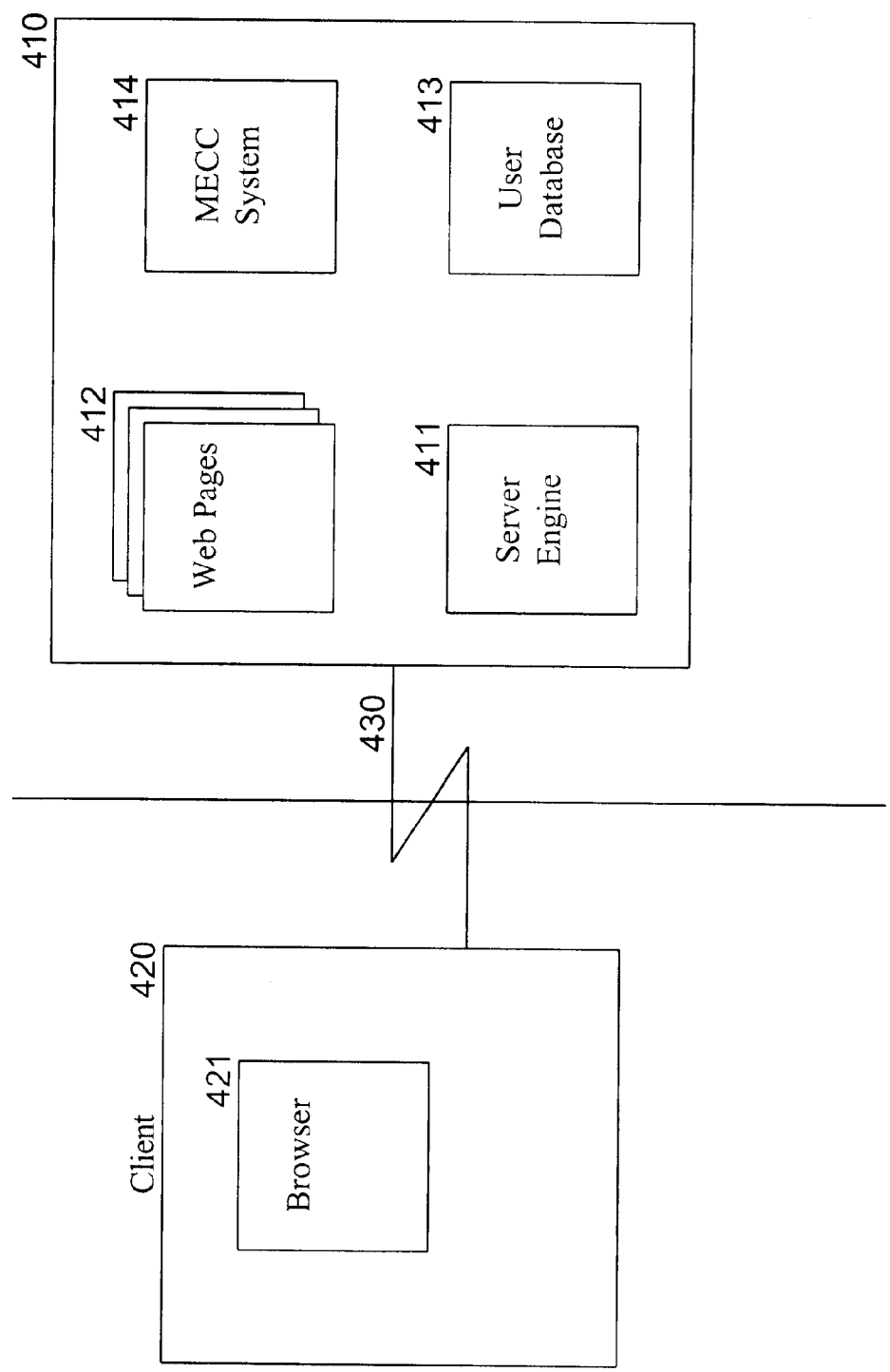
FIG. 4 is a block diagram illustrating an embodiment of the present invention.

FIG. 4 is a block diagram illustrating an embodiment of the present invention. This embodiment supports electronic commerce with multiple contexts over the Internet using the World Wide Web. The server system 410 includes a server engine 411, various Web pages 412, a user database 413, and the multiple electronic commerce context ("MECC") system (or multiple shopping cart system in one embodiment). The server engine receives HTTP Is requests to access Web pages identified by URLs and provides the Web pages to the various client systems. Such an HTTP request may indicate that the purchaser has performed the single action to select a different shopping cart or electronic context. The user database includes purchaser-specific order information such as the name of the user and electronic commerce context ("ECC") profile information for each electronic commerce context. The MECC system contains various components that perform the functions of multiple electronic commerce context. Various components are described below in detail. The client system 420 contains a browser 421. The server and client systems interact by exchanging information via communications link 430, which may include transmission over the Internet.

One skilled in the art would appreciate that the multiple electronic commerce context techniques can be used in various environments other than the Internet. For example, the techniques can be used in a single computer system environment rather than in a client/server environment. Also, various communication channels may be used such as local area network, wide area network, or point-to-point dial up connection. Also, a server system may comprise any combination of hardware or software that can support multiple electronic commerce contexts. A client system may comprise any combination of hardware or software that can interact with the server system. These systems may include television-based systems or various other consumer products through which orders may be placed. In general, the client and server system may include a central processing unit, a memory, and storage devices. The multiple electronic commerce context ("MECC") system may be stored in a computer-readable medium such as memory or a CD-ROM.

FIG. 5 is a block diagram illustrating a sample data structure for storing electronic commerce context ("ECC") profile information. One skilled in the art will appreciate that the many different organizations of data structures could be used. The sample data structure of FIG. 5 contains a user table 501, a context mapping table 502, and a context table 503. In this example, user table 501 contains an entry for each user. Each entry contains a user ID and information describing the user (e.g., user name and email address). For example, one entry represents the user with the user ID of "JSmith." The context mapping table 502 contains an entry for each context for each user. Each entry contains a user ID and a context ID. For example, the user with the user ID of "JSmith" has two contexts identified by context IDs "204" and "220." The context table 503 contains an entry for each context. Each entry contains the context ID and information describing the context (e.g., context name, and billing information). For example, the context identified by the context ID of "204" has the context name of "Johnny's." The tables of this sample data structure may contain many more columns of information. For example, the user table may also contain the address of the user. The multiple electronic commerce context ("MECC") system may access ECC profile information for a user by using the user's user ID to determine the context ID of the user's current context from the context mapping table. The MECC system may then use the retrieved context ID to retrieve the context information for the context table. The sample data structure may also contain activity information describing electronic commerce activity conducted while a user is in each electronic commerce context. This activity information may track items added to a shopping basket, banner advertisements selected, and Web sites visited when in that electronic commerce context. The activity information may be collected by logging and tagging the activity with the current electronic commerce context. The MECC system can then use this collected activity information to, for example, customize advertising or recommendations while the user is in a certain electronic commerce context.

Figure 6:
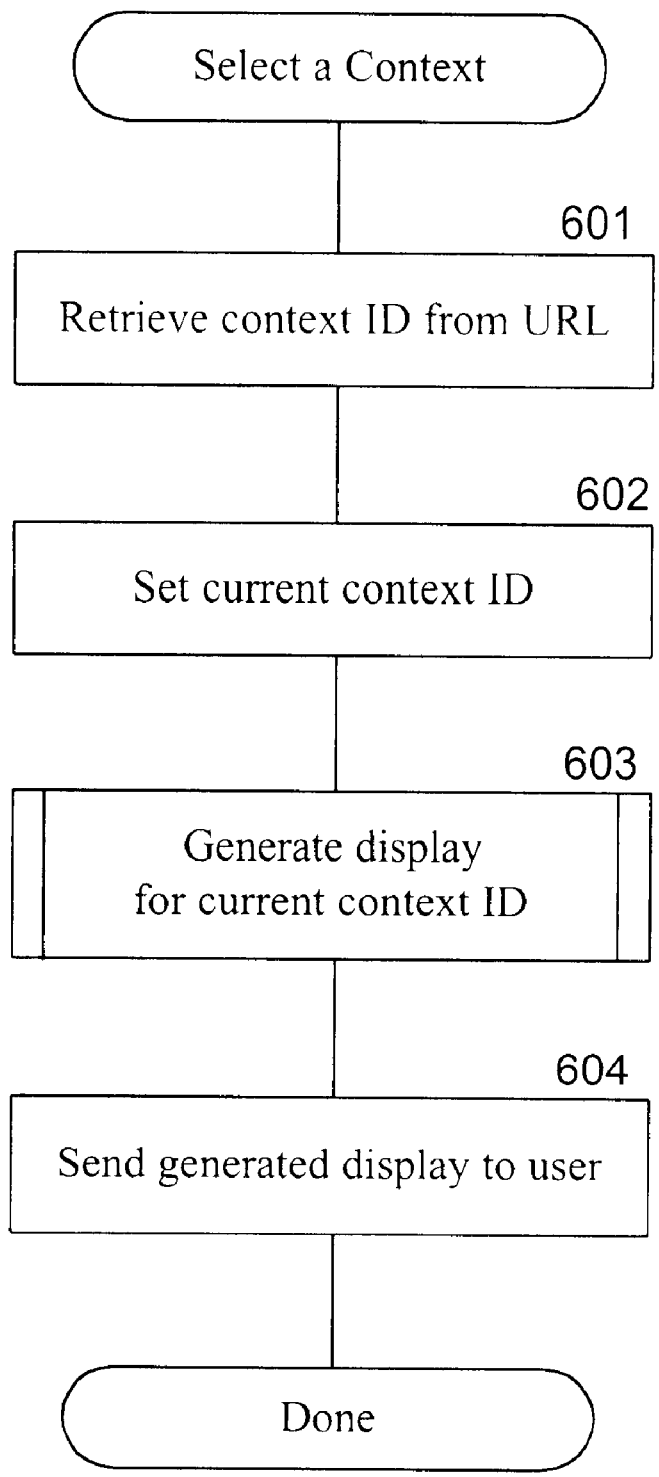
FIG. 6 is a flow diagram of a routine that processes the selection of the new electronic commerce context.

FIGS. 6–11 illustrate one embodiment of various components of the multiple electronic commercial context ("MECC") system in the WWW environment. FIG. 6 is a flow diagram of a routine that processes the selection of the new electronic commerce context. In one embodiment, when a user selects a new context from a shopping cart selection navigation bar, a URL is sent to the server computer system. That URL contains information identifying is the new context. This routine performs the processing to switch the electronic commerce context and generate the appropriate displays. In step 601, the routine retrieves the context ID (or other identifying information) from the URL received from the client. In step 602, the routine sets the current context ID for the user. In step 603, the routine generates a display (e.g., and HTML document) for the current context. The generation of the display is described in detail in FIG. 7. In step 604, the routine sends the generated display to the user's client system. The routine then completes.

Figure 7:
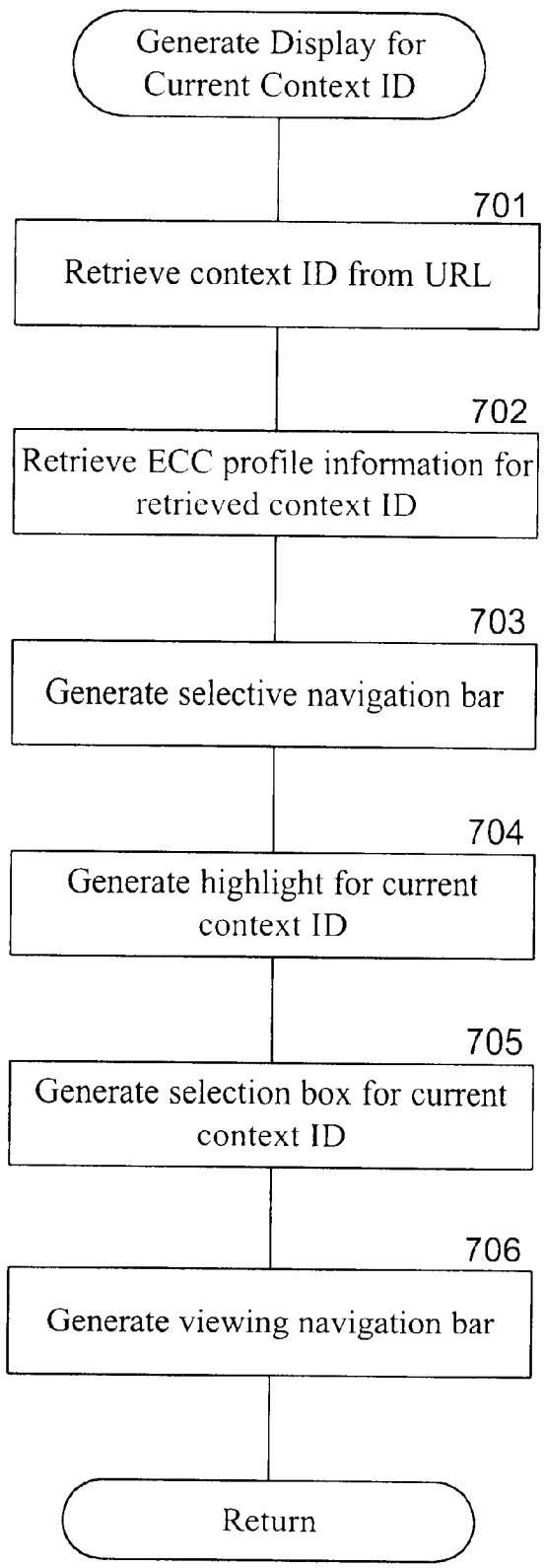
FIG. 7 is a flow diagram of a routine that generates a display for the current context.

FIG. 7 is a flow diagram of a routine that generates a display for the current context. This routine retrieves the electronic commerce context ("ECC") profile information for the current context ID and generates the display accordingly. In this embodiment, the generated display is described in a HTML document. In step 701, the routine retrieves the current context ID for the user. In step 702, the routine retrieves the ECC profile information for the retrieved context ID. In step 703, the routine generates a context selection navigation bar (e.g., the shopping cart selection navigation bar) that identifies each of the contexts for the user. In step 704, the routine highlights the current context on the generated selection navigation bar. In step 705, the routine generates the selection box in accordance with the ECC profile information for the current context ID. In step 706, the routine generates the context viewing navigation bar (e.g., shopping cart viewing navigation bar) based on the retrieved ECC profile information. The routine then returns.

Figure 8:
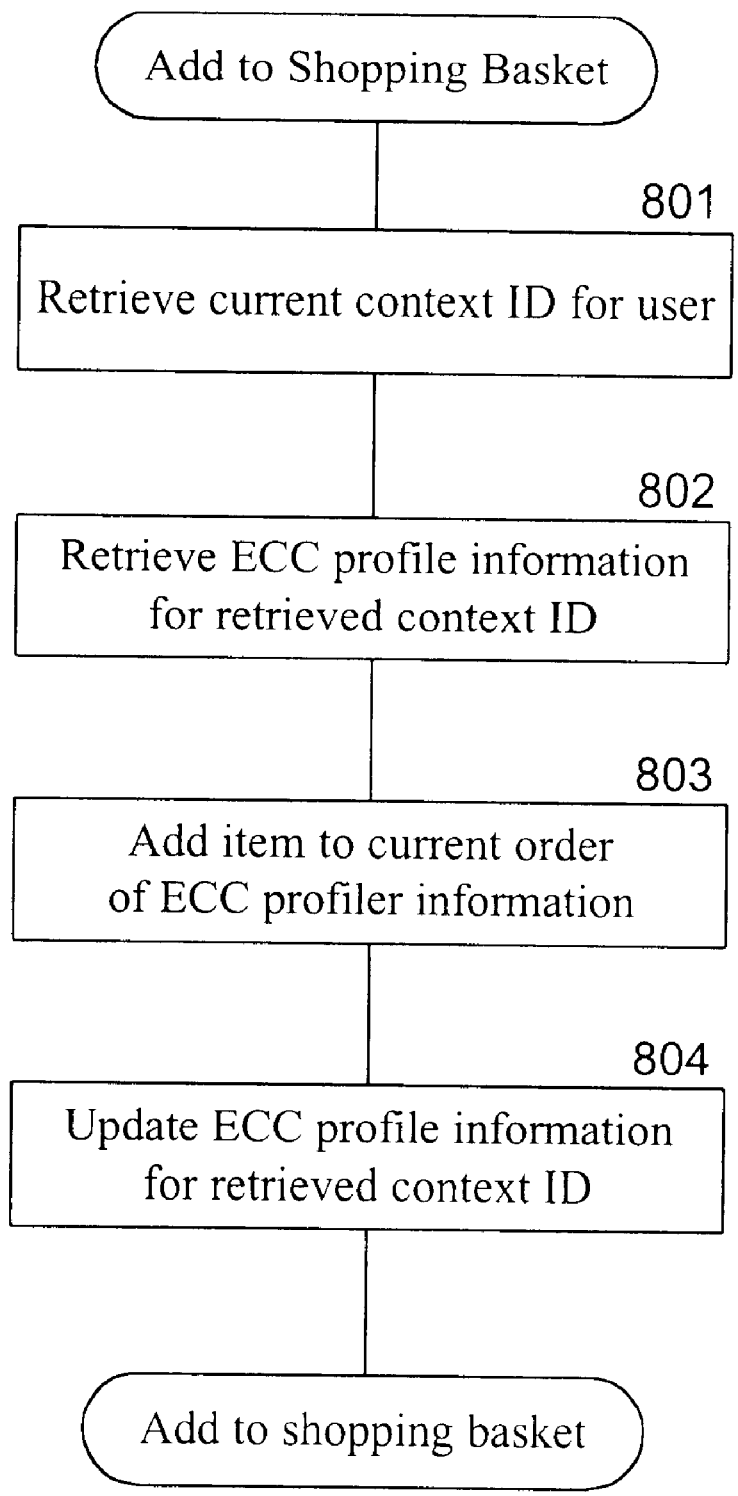
FIG. 8 is a flow diagram of a routine that adds an item to the shopping cart for the currently selected context.

FIG. 8 is a flow diagram of a routine that adds an item to the shopping cart for the currently selected context. This routine is invoked when a user selects the add-to shopping cart button. In step 801, the routine retrieves the current context ID for the user. In step 802, the routine retrieves the electronic commerce context ("ECC") profile information for the current context ID. In step 803, the routine adds the item to the shopping cart for the current context ID within the retrieved ECC profile information. In step 804, the routine updates the ECC profile information for the current context ID in the user database. The routine then completes.

Figure 9:
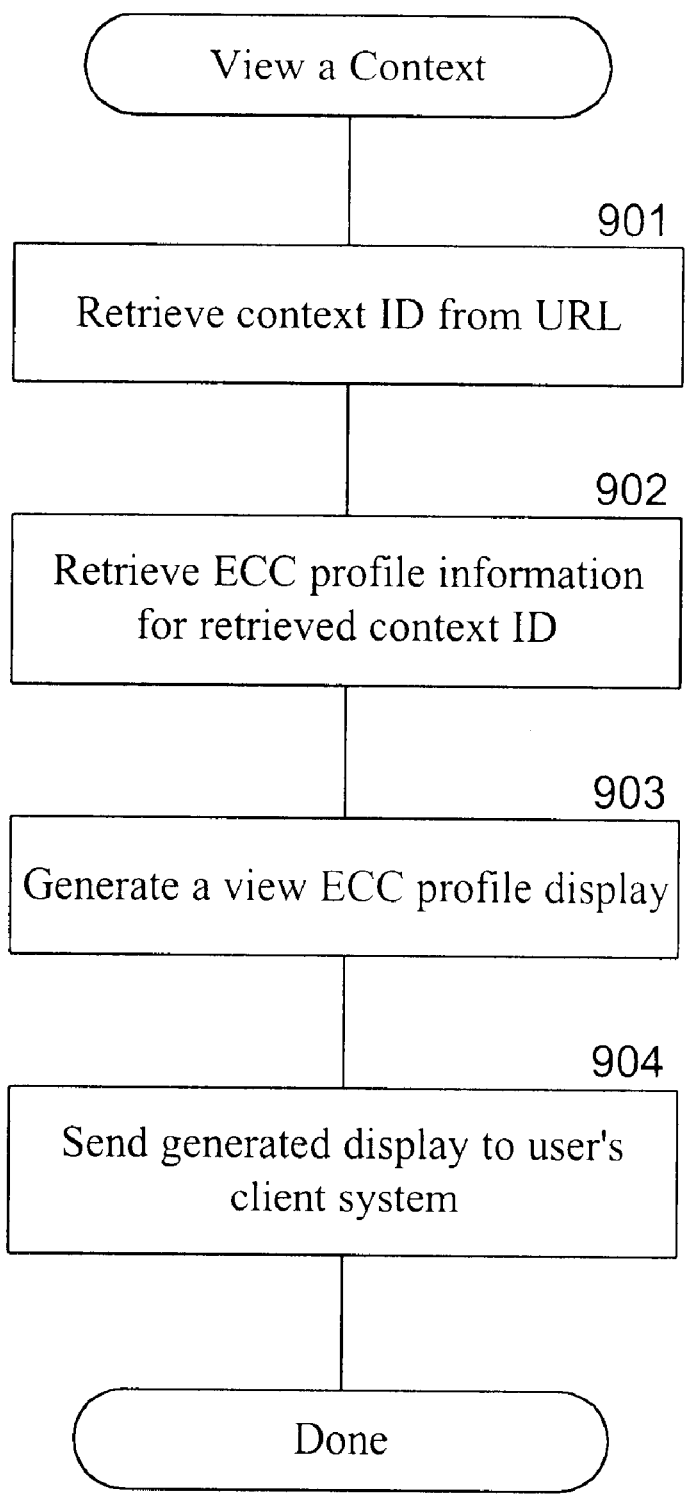
FIG. 9 is a flow diagram of a routine that processes a request to view electronic commerce context ("ECC") profile information for a context.

FIG. 9 is a flow diagram of a routine that processes a request to view electronic commerce context ("ECC") profile information for a context. This routine is invoked when a user selects the context viewing navigation bar. In step 901, the routine retrieves the context ID (or other identifying information such as user ID and session ID) from the URL associated with the selected portion of the viewing navigation bar. In step 902, the routine retrieves the ECC profile information for the retrieved context ID. In step 903, the routine generates a display for the retrieved ECC profile information. In step 904, the routine sends the generated display for the user's client computer system. The routine then completes.

Figure 10:
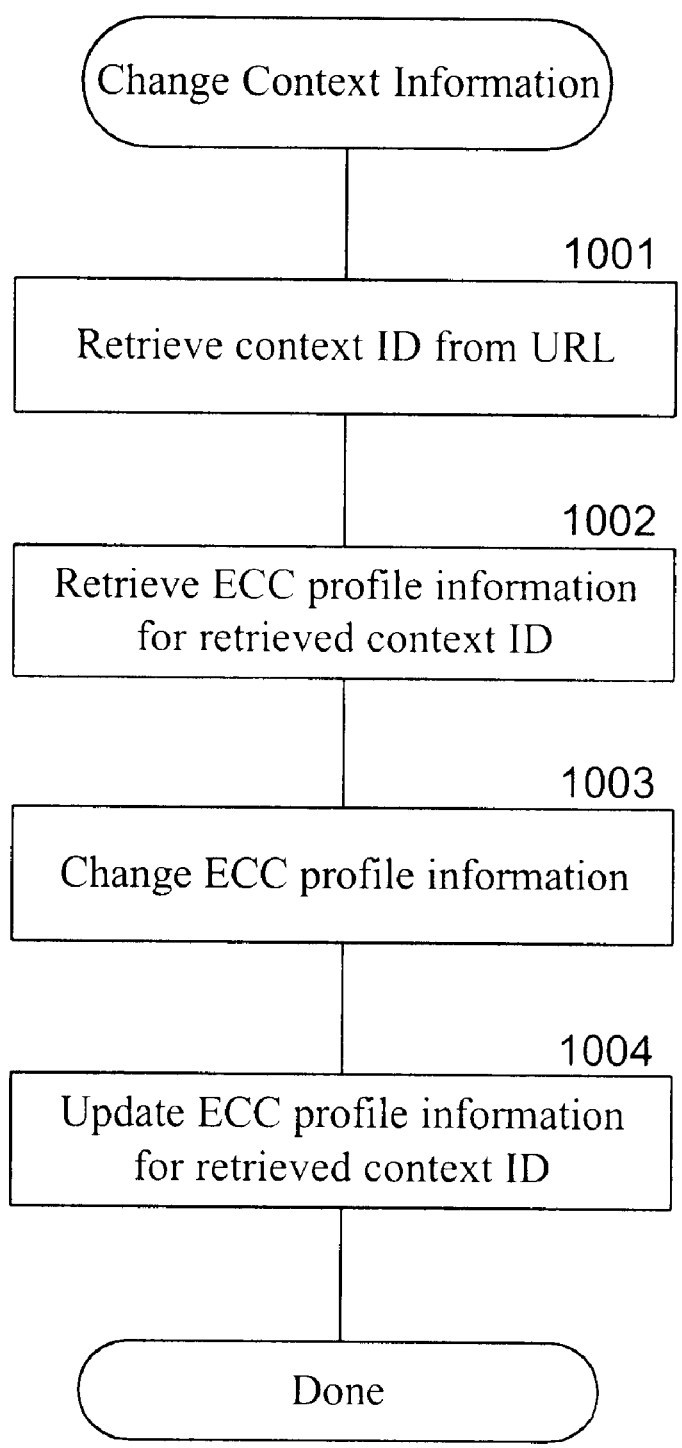
FIG. 10 is a flow diagram of a routine for updating electronic commerce context ("ECC") profile information.

FIG. 10 is a flow diagram of a routine for updating electronic commerce context ("ECC") profile information.

This routine is invoked when a user indicates to change any of the ECC profile information. For example, this routine is invoked when a user changes shipping information or the identifier on a context. In step 1001, the routine retrieves the context ID from the URL. Alternatively, the context ID can be retrieved from a mapping of a certain key (e.g., ID or user ID) to context ID. In step 1002, the routine retrieves the ECC profile information for the retrieved context ID. In step 1003, the routine changes the ECC profile information. In step 1004, the routine updates the ECC profile information for the retrieved context ID in the user database. The routine then completes.

Figure 11:
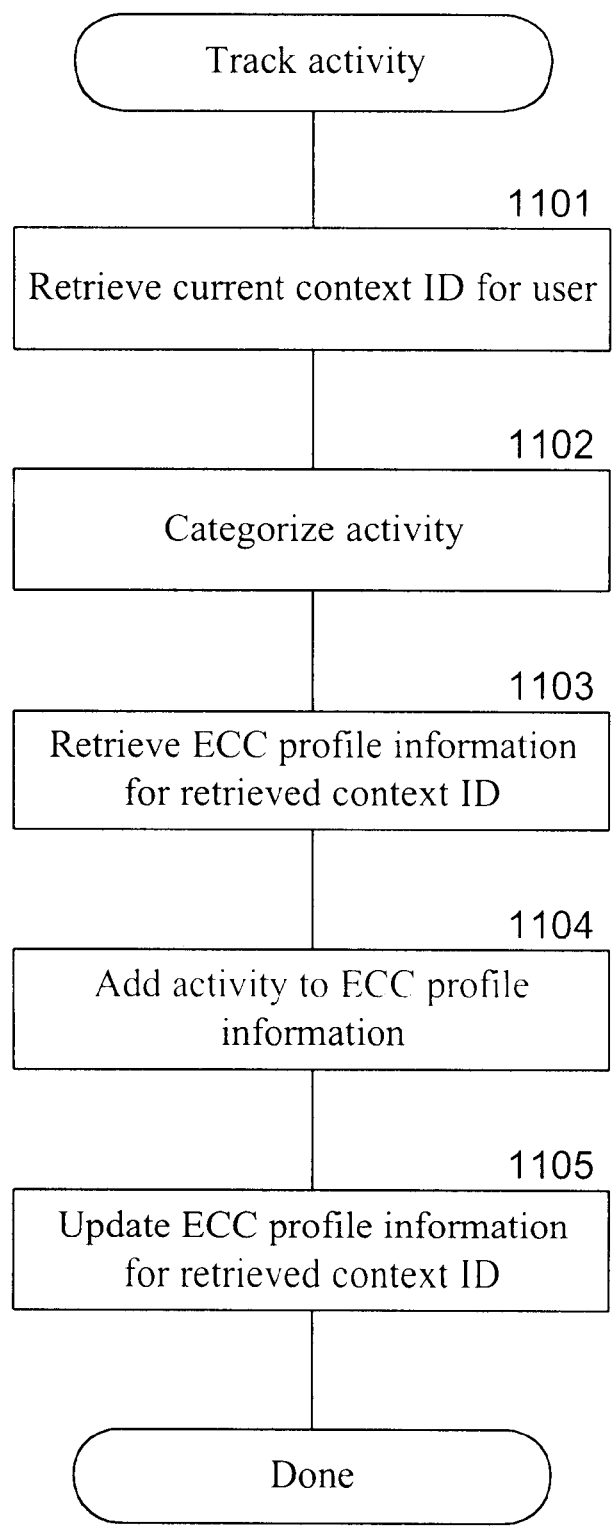
FIG. 11 is a flow diagram of a routine that stores information on the activities of a user.

FIG. 11 is a flow diagram of a routine that stores information on the electronic commerce activity of a user. The multiple electronic commerce context ("MECC") system may track various user activity that occurs while in each context. For example, the MECC system may track items that the user viewed, items that the user purchased, or links that the user assessed while in a context. In step 1101, the routine retrieves the current context ID for the user. In step 1102, the routine categorizes the electronic commercial activity (e.g., "viewing" or "selecting" an item). In step 1103, the routine retrieves the electronic commerce context ("ECC") profile information for the current context ID for the categorization. In step 1104, the routine updates the activity information to the ECC profile information. In step 1105, the routine updates the ECC profile information for the current context ID. The routine then completes.

Another embodiment of the present invention provides a method and system for limiting the scope of the electronic commerce that may be conducted while in an electronic commerce context ("ECC"). For example, if the electronic commerce is the purchasing of video tapes, then the user, when purchasing video tapes for a child, may want to limit displaying of information to only those video tapes with a family-oriented rating ("G"). The multiple electronic commerce context ("MECC") system limits the scope of electronic commerce by allowing the user to define filters that can be applied to an ECC. For example, the items available to be purchased may have various attributes (e.g., cost, rating, or general categorization such as documentary) associated with them. The MECC system may input from the user a series of filter criteria that specify the values of attributes, such as "rating =G," that each item must have in order to be within the scope of the electronic commerce conducted within an ECC. Filters may be particularly useful to limit the scope of electronic commerce conducted by a child. Also, filters may be password protected so that, for example, a child does not change the filter. In one embodiment, the MECC system stores the filter criteria along with the profile information for each electronic commerce context. One skilled in the art will appreciate that the filter criteria can be specified using various well-known techniques, such as listing a series of logic conditions for the attributes using logical-ANDs and logical-ORs. The MECC system may alternatively apply the filter criteria only when an item is selected, rather than when the information for the item is displayed. In this way, the user may view the information for all the available items, but the MECC system would prevent the purchase of items (or at least warn the user) that do not meet the filter criteria. The MECC system may also provide predefined filters that a user may select for an ECC. For example, a filter may be predefined for a "country theme" if the items available to be purchased are video tapes, music CD's, and clothing. The "country theme" may include the filter criterion "book=western or music=country." In one embodiment, if the electronic commerce is conducted using a search engine to identify those items that the user may want to purchase, then the filter criteria for the ECC may be automatically applied as part of each search for that ECC.

Another embodiment of the present invention provides a method and system for providing multiple interaction contexts for a user interacting with a computer system. Each interaction context has associated information relating to the interaction conducted while the user was in that interaction context. The interaction may be, for example, the conducting of electronic commerce (as described above), the using of a search engine, or the browsing through Web pages. When engaging in such interactions, the user may specify one of the interaction contexts. The system then associates information relating to interaction with the specified interaction context. When a user subsequently engages in interactions while that interaction context is currently specified, the associated information is available to influence the interaction. For example, if the interaction is the use of a search engine, then a user may use one interaction context for home and another interaction context for work. If the user is normally interested in legal documents when at work, then the work interaction context information would relate to legal documents. In contrast, if the user is normally interested in sports documents when at home, then the home interaction context information would relate to sports documents. Thus, when the user inputs a search for the word "court," the search engine may identify an entirely different set of related documents depending on whether the work or home interaction context is currently selected.

From the foregoing it will be appreciated that, although specific embodiments of the invention have been described herein for purposes of illustration, various modifications may be made without deviating from the spirit and scope of the invention. For example, the multiple electronic commerce context ("MECC") system may provide a facility to "reset" a context to default values or to "copy" a context. That is, if a user needs to change certain context information (e.g., billing and shipment information), the user can indicate to "reset" or "copy" a context. When a context is "reset," its information may be reset to certain initial values. When a context is "copied," the information of the context replaces the information of another context. Also, in various embodiments, the shopping cart selection navigation bar can be used for dragging-and-dropping items into the various shopping carts. For example, a user may select an item by depressing a button on a pointing device, then drag the selected item to the selection navigation bar, and drop the item into a shopping cart by releasing the button. When an item is dragged-and-dropped into a shopping cart, the MECC system may also change the currently selected shopping cart to the shopping cart into which the item has been dropped or maintain the current selection of a shopping cart. Also, a shopping cart (or more generally an aggregation) can function as a gift registry. That is, a user can select one or more items to be placed in a shopping cart, and the shopping cart can be provided to other users. The other users can purchase a registered item from the shopping cart using the shipment information of the shopping cart but the other user's billing information. Once items are purchased, the gift registry is updated accordingly. Also, a user's electronic commerce context can be provided to other users so that recommendations for gifts for the user based on electronic commerce context profile information can be provided to the other users. The term "user" as used herein refers to any entity that may use a computer system, such as a person, another computer system, or computer program. In addition, the user may operate on behalf of an organization with an account for conducting electronic commerce. Thus, the user ID may be an account ID for the organization or division of the organization. Accordingly, the invention is not limited except as by the appended claims.

What is claimed is:

1. A method in a computer system for conducting electronic commerce, the method comprising:
   providing a plurality of electronic shopping carts, each electronic shopping cart having an indication of items currently within the electronic shopping cart and billing and shipment information;
   generating a display that identifies each of the provided electronic shopping carts;
   sending the generated display to a user computer system;
   receiving a selection of one of the identified electronic shopping carts from the user computer system;
   receiving a selection of an item from the user computer system;
   in response to receiving the selection of the item, adding the item to the selected electronic shopping cart;
   receiving an indication to checkout the items in the selected electronic shopping cart from the user computer system; and
   in response to receiving the indication to checkout,
     shipping the items in the selected electronic shopping cart in accordance with the shipment information of the selected electronic shopping cart; and
     billing for the items in the selected electronic shopping cart in accordance with the billing information for the selected electronic shopping cart
   whereby a user can select each of the plurality of electronic shopping carts for adding items to the electronic shopping carts.

2. The method of claim 1 wherein the user can provide an identifier for each electronic shopping cart.

3. The method of claim 1 including tracking activity performed by the user while each electronic shopping cart is selected.

4. The method of claim 1 wherein, after receiving a selection of an electronic shopping cart, modifying a display based on information relating to the selected electronic shopping cart.

5. The method of claim 1 wherein the user selects one of the plurality of electronic shopping carts with a single action.

6. The method of claim 1 wherein the selection of an item and the indication to checkout the item is performed by a single action.

7. A method in a computer system for maintaining information relating to conducting electronic commerce with a vendor, the method comprising:
   providing a plurality of electronic commerce contexts for a user for use in conducting electronic commerce with the vendor, each electronic commerce context having information relating to electronic commerce conducted between the user and the vendor while in that electronic commerce context;
   receiving from the user a selection of one of the plurality of electronic commerce contexts;
   after receiving the selection of the one of the plurality of electronic commerce contexts, conducting electronic commerce between the user and the vendor; and
   associating, with the selected electronic commerce context, information relating to the electronic commerce conducted between the user and the vendor so that when the user subsequently selects that selected electronic commerce context from the plurality of electronic commerce contexts, the associated information is available for conducting subsequent electronic commerce between the user and the vendor.

8. The method of claim 7 wherein the electronic commerce includes selecting items and the information includes the identity of the items previously selected.

9. The method of claim 8 including presenting to the user a recommendation for items based on items previously selected while in the currently selected electronic commerce context.

10. The method of claim 8 including presenting to another user a recommendation for items based on items previously selected by the user while in a certain electronic commerce context.

11. The method of claim 10 wherein the other user selects an item as a gift for the user.

12. The method of claim 8 including providing to another user a list of items selected in one of the electronic commerce contexts.

13. The method of claim 12 wherein the other user purchases one of the items in the list as a gift for the user.

14. The method of claim 13 wherein the purchased gift is shipped to the user in accordance with the electronic commerce context in which the item was selected.

15. The method of claim 7 wherein the user establishes a connection when conducting electronic commerce and including persistently storing the information so that the information is available when the user next establishes a connection.

16. The method of claim 15 wherein the information includes items selected to be ordered but that have not yet been ordered.

17. The method of claim 7 wherein each electronic commerce context has associated billing information relating to electronic commerce conducted while in that electronic commerce context.

18. The method of claim 7 wherein each electronic commerce context has associated shipment information relating to electronic commerce conducted while in that electronic commerce context.

19. The method of claim 7 wherein the receiving of a selection includes sending to the user an indication of each of the plurality of electronic commerce contexts.

20. The method of claim 19 wherein the sent indications are to be displayed simultaneously to the user for selection of one of the indications.

21. The method of claim 20 wherein the selection is performed with a single action by the user.

22. The method of claim 20 wherein the selection is performed by a click of a pointing device.

23. The method of claim 7 including receiving from the user an identifier for an electronic commerce context.

24. The method of claim 23 wherein each electronic commerce context is identified by the identifier received from the user.

25. The method of claim 24 wherein each electronic commerce is derivable from the identifier received from the user.

26. The method of claim 7 wherein single-action ordering is enabled and all single-action ordering is relative to the selected electronic commerce context.

27. The method of claim 26 wherein when generating a display for single-action ordering, identifying the selected electronic commerce context.

28. The method of claim 7 wherein the user indicates that another user can access information associated with an electronic commerce context.

29. The method of claim 7 including limiting the electronic commerce conducted while an electronic commerce context is selected to a specified scope for that electronic commerce context.

30. The method of claim 29 wherein the scope is specified by a filter that is applied when electronic commerce is conducted while that electronic commerce context is selected.

31. The method of claim 29 wherein the limiting includes displaying only those items that satisfy a certain criteria.

32. The method of claim 29 wherein the limiting includes allowing purchase of only those items that satisfy a certain criteria.

33. A computer system for maintaining information relating to conducting electronic commerce with a vendor, comprising:
 a data component for storing information relating to a plurality of electronic commerce contexts for a user, the information relating to electronic commerce conducted between the user and the vendor while in that electronic commerce context;
 a component that receives from the user a selection of one of the plurality of electronic commerce contexts; and
 a component that, after receiving the selection of the one of the plurality of electronic commerce contexts, conducts electronic commerce between the user and the vendor and stores information relating to the conducted electronic commerce in association with the selected electronic commerce context.

34. The computer system of claim 33 wherein the electronic commerce includes selecting items and the information includes the identity of the items previously selected.

35. The computer system of claim 34 including a component that generates a recommendation for items to select based on items previously selected while in the currently selected electronic commerce context.

36. The computer system of claim 35 wherein the generated recommendation is presented to another user.

37. The computer system of claim 36 wherein an item selected by the other user is a gift for the user.

38. The computer system of claim 33 including a component that persistently stores the information.

39. The computer system of claim 38 wherein the information includes items selected to be ordered but that have not yet been ordered.

40. The computer system of claim 33 wherein each electronic commerce context has associated billing information relating to electronic commerce conducted while in that electronic commerce context.

41. The computer system of claim 33 wherein each electronic commerce context has associated shipment information relating to electronic commerce conducted while in that electronic commerce context.

42. The computer system of claim 33 wherein the component that receives a selection sends to the user an indication of each of the plurality of electronic commerce contexts.

43. The computer system of claim 42 wherein the sent indications are to be displayed simultaneously to the user for selection of one of the indications.

44. The computer system of claim 33 wherein the component that conducts electronic commerce includes limiting the electronic commerce conducted to a specified scope for the selected electronic commerce context.

45. The computer system of claim 44 wherein the scope is specified by a filter that is applied when electronic commerce is conducted.

46. The computer system of claim 44 wherein the limiting includes displaying only those items that satisfy a certain criteria.

47. The computer system of claim 44 wherein the limiting includes allowing purchase of only those items that satisfy a certain criteria.

48. A method for interacting with a computer, the method comprising:
 selecting one of a plurality of interaction contexts for a user; and
 after selecting an interaction context, interacting with the user
 whereby the interacting is associated with the selected interaction context wherein the user provides at least one of the interaction contexts.

49. The method of claim 48 including displaying selection navigation information that indicates each of the plurality of interaction contexts.

50. The method of claim 49 wherein the selecting is performed by a single action relating to the displayed selection navigation information.

51. The method of claim 48 wherein the interacting includes use of a search engine.

52. The method of claim 48 wherein the interacting includes conducting of electronic commerce.

53. The method of claim 48 wherein each of the plurality of interaction contexts has associated information relating to interactions engaged in while that interaction context was selected.

54. The method of claim 48 including displaying viewing navigation information that indicates each of the plurality of interaction contexts.

55. The method of claim 54 herein when an interaction context is selected from the viewing navigation information, information relating to that interaction context is displayed.

56. The method of claim 48 wherein the user supplies an identifier for each interaction context.

57. A method for interacting with a computer, the method comprising:
 selecting one of a plurality of interaction contexts for a user; and
 after selecting an interaction context, interacting with the user
 whereby the interacting is associated with the selected interaction context wherein the user provides all of the interaction contexts.

58. A method for interacting with a computer, the method comprising:
 selecting one of a plurality of interaction contexts for a user; and
 after selecting an interaction context, interacting with the user
 whereby the interacting is associated with the selected interaction context wherein only one of the plurality of interaction contexts is initially provided.

59. The method of claim 58 wherein the user subsequently provides additional interaction contexts.

* * * * *

UNITED STATES PATENT AND TRADEMARK OFFICE
CERTIFICATE OF CORRECTION

PATENT NO. : 6,629,079 C1
APPLICATION NO. : 90/008231
DATED : April 14, 2009
INVENTOR(S) : Joel R. Spiegel et al.

It is certified that error appears in the above-identified patent and that said Letters Patent is hereby corrected as shown below:

On the title page, item [75]:

second named inventor:

delete "Maryam Mobit" and insert -- Maryam Mohit --.

Signed and Sealed this

Thirteenth Day of October, 2009

David J. Kappos
*Director of the United States Patent and Trademark Office*

US006629079C1

(12) EX PARTE REEXAMINATION CERTIFICATE (6768th)
United States Patent
Spiegel et al.

(10) Number: US 6,629,079 C1
(45) Certificate Issued: Apr. 14, 2009

(54) METHOD AND SYSTEM FOR ELECTRONIC COMMERCE USING MULTIPLE ROLES

(75) Inventors: Joel R. Spiegel, Woodinville, WA (US); Maryam Mobit, Seattle, WA (US)

(73) Assignee: Amazon.com, Inc., Seattle, WA (US)

Reexamination Request:
No. 90/008,231, Sep. 22, 2006

Reexamination Certificate for:
Patent No.: 6,629,079
Issued: Sep. 30, 2003
Appl. No.: 09/104,942
Filed: Jun. 25, 1998

(51) Int. Cl.
*G06Q 30/00* (2006.01)

(52) U.S. Cl. .............................. 705/26; 705/27; 705/10; 705/3

(58) Field of Classification Search ................ 705/3, 705/10, 26, 27, 14
See application file for complete search history.

(56) References Cited

U.S. PATENT DOCUMENTS

| | | | |
|---|---|---|---|
| 5,173,594 A | 12/1992 | McClure | |
| 5,319,542 A | 6/1994 | King, Jr. et al. | |
| 5,555,496 A | 9/1996 | Tackbary et al. | |
| 5,621,812 A | * 4/1997 | Deaton et al. | 705/14 |
| 5,710,887 A | 1/1998 | Chelliah et al. | |
| 5,745,681 A | 4/1998 | Levine et al. | |
| 5,826,245 A | 10/1998 | Sandberg-Diment | |
| 5,845,260 A | 12/1998 | Nakano et al. | |
| 5,864,830 A | 1/1999 | Armetta et al. | |
| 5,905,973 A | 5/1999 | Yonezawa et al. | |
| 5,907,831 A | 5/1999 | Lotvin et al. | |
| 5,918,213 A | 6/1999 | Bernard et al. | |
| 5,953,710 A | 9/1999 | Fleming | |
| 5,960,411 A | 9/1999 | Hartman et al. | |

| | | |
|---|---|---|
| 5,970,474 A | 10/1999 | LeRoy et al. |

(Continued)

FOREIGN PATENT DOCUMENTS

| | | |
|---|---|---|
| CA | 2236015 | 5/1997 |
| CA | 2246933 | 3/1999 |
| EP | 1 170 690 | 1/2002 |

OTHER PUBLICATIONS

Schorow, Stephanie (Jan. 30, 1995). Cybersybils have personalities all their own: [01 Edition]. Boston Herald, p. 027. Retrieved Sep. 17, 2008, from ProQuest Central database. (Document ID: 19654287).*

(Continued)

*Primary Examiner*—Sara S Clarke

(57) ABSTRACT

A computer system for conducting electronic commerce. The system provides multiple electronic shopping carts for each user. Each electronic shopping cart has an indication of items currently within the electronic shopping cart and billing and shipment information. The system generates a display that identifies each of the electronic shopping carts and sends the generated display to a user computer system. The system then receives a selection of one of the identified electronic shopping carts from the user computer system and receives a selection of an item from the user computer system. In response to receiving the selection of the item, the system adds the item to the selected electronic shopping cart. The system then receives an indication to checkout the items in the selected electronic shopping cart from the user computer system. In response to receiving the indication to checkout, the system ships the items in the selected electronic shopping cart in accordance with the shipment information of the selected electronic shopping cart and bills for the items in the selected electronic shopping cart in accordance with the billing information for the selected electronic shopping cart. The system thus allows a user to select each of the electronic shopping carts for adding items to each electronic shopping cart.

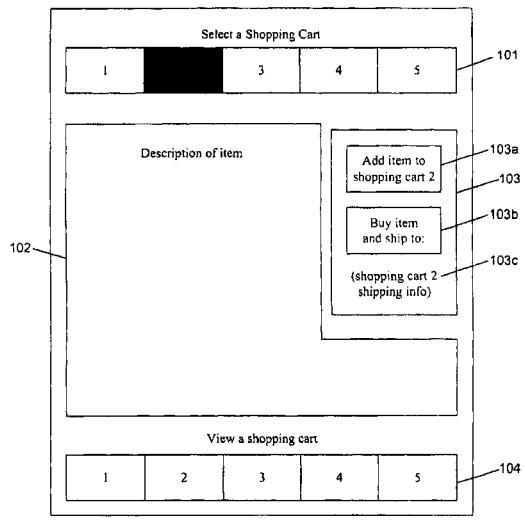

U.S. PATENT DOCUMENTS

| | | | |
|---|---|---|---|
| 6,014,638 A * | 1/2000 | Burge et al. | 705/14 |
| 6,021,943 A | 2/2000 | Chastain | |
| 6,023,682 A | 2/2000 | Checchio | |
| 6,125,352 A | 9/2000 | Franklin et al. | |
| 6,125,353 A | 9/2000 | Yagasaki | |
| 6,193,155 B1 | 2/2001 | Walker et al. | |
| 6,266,649 B1 | 7/2001 | Linden et al. | |
| 6,317,722 B1 | 11/2001 | Jacobi et al. | |
| 6,473,738 B1 | 10/2002 | Garrett | |
| 6,490,567 B1 | 12/2002 | Gregory | |
| 6,615,189 B1 | 9/2003 | Phillips et al. | |
| 6,850,917 B1 | 2/2005 | Hom et al. | |
| 6,876,977 B1 | 4/2005 | Marks | |
| 2002/0194087 A1 | 12/2002 | Spiegel et al. | |
| 2004/0034568 A1 | 2/2004 | Sone | |
| 2004/0215534 A1 | 10/2004 | Gautier et al. | |
| 2006/0122895 A1 | 6/2006 | Abraham et al. | |
| 2007/0078727 A1 | 4/2007 | Spiegel et al. | |

OTHER PUBLICATIONS

Anonymous. "I Can Get It For You Wholesale". Credit Card Management. Nov. 1995; 8,8; Proquest Central, p. 10.*

Brooker "Purchasing cards: the next generation", *Modern Purchasing*, Jun. 1997.

Dufek "Censorship does not compute", *The Atlanta J—Constitution*, Jun. 23, 1996.

NewsGroup S. R. Callicutt, DMV to put Social Security Numbers on Driver's Licenses, 1 page, Jul. 19, 1994.

NewsGroup C Moore, Bill printed part of my Calling Card Number, 2 pages, Oct. 14, 1993.

NewsGroup Hamilton Richards Jr., Final Grades, 1 page, Dec. 19, 1994.

Los Angeles Times, FED Moves on ATM Fraud: Rule on Customer Receipts amended to Thwart thieves, Business, Part D, p. 3 of Mar. 17, 1995.

MiniVend 2.03 Documentation published on the www.minivend.com/minivend/ website on Jan. 8, 1997.

Cowart, Robert, "Mastering Windows 95", The Introduction, Chapters 1, 5, 7, 12, 26, 38 and Appendix A, published Mar. 1997 by Sybex, Inc.

Ivens, et al., "Discover America Online", Chapters 1 and 3, published Mar. 1997 by IDS Books Woldwide, Inc.

Printouts from the Internet websites www.netgrocer.com and www4.netgrocer.com dated Jun. 24, 1998.

Unknown Author, "LiveOffice Corp. Adds Online Shopping Cart Monitoring Feature to LiveSiteManager," PR Newswire, Jul. 14, 2003, p. 1.

* cited by examiner

US 6,629,079 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentablity of claims 1–47 is confirmed.

Claim 57 is cancelled.

Claims 48 and 58 are determined to be patentable as amended.

Claims 49–56 and 59, dependent on an amended claim, are determined to be patentable.

New claims 60–122 are added and determined to be patentable.

48. A method for interacting with a computer, the method comprising:
    selecting one of a plurality of interaction contexts for a user; and
    after selecting an interaction context, interacting with the user *and providing advertisements that are customized based on previous interacting with the user when in the selected interaction context and not based on previous interacting with the user in other interaction contexts*
    whereby the interacting is associated with the selected interaction context wherein the user provides at least one of the interaction contexts.

58. A method for interacting with a computer, the method comprising:
    selecting one of a plurality of interaction contexts for a user; and
    after selecting an interaction context, interacting with the user
    whereby the interacting is associated with the selected interaction context wherein only one of the plurality of interaction contexts is initially provided *and the user indicates that another user can access information relating to the interacting that is associated with an interaction context.*

60. *The method of claim 3 including presenting to the user a recommendation for an item based on the tracked activity that was performed by the user while the selected electronic shopping cart was previously selected.*

61. *The method of claim 3 including presenting to another user a recommendation for an item based on the tracked activity that was performed by the user while the selected electronic shopping cart was previously selected by the user.*

62. *The method of claim 61 wherein the other user selects the item as a gift for the user.*

63. *The method of claim 1 including providing to another user a list of items selected for an electronic shopping cart.*

64. *The method of claim 63 wherein the other user purchases one of the items of the list as a gift for the user.*

65. *The method of claim 64 wherein the purchased gift is shipped to the user in accordance with the shipment information of the electronic shopping cart.*

66. *The method of claim 64 wherein the purchased gift is paid for with billing information provided by the other user.*

67. *The method of claim 66 wherein the purchased gift is shipped to the user in accordance with the shipment information of the electronic shopping cart.*

68. *The method of claim 3 including persistently storing information of the tracked activity for an electronic shopping cart wherein the user indicates that another user can access the persistently stored information of the tracked activity for the electronic shopping cart.*

69. *The method of claim 3 including persistently storing information of the tracked activity for an electronic shopping cart that is selected and when the user later selects the electronic shopping cart, presenting to the user an advertisement for an item based on the persistently stored tracked activity that was performed by the user while the selected electronic shopping cart was previously selected.*

70. *The method of claim 1 including limiting the items that can be accessed via an electronic shopping cart to a specified scope of items for that electronic shopping cart.*

71. *The method of claim 70 wherein the scope is specified by a filter that is applied when that electronic shopping cart is selected.*

72. *The method of claim 71 wherein access to the filter is controlled by a password.*

73. *The method of claim 70 wherein the limiting includes allowing only those items that satisfy a certain criterion to be added to the electronic shopping cart.*

74. *The method of claim 70 wherein the limiting includes allowing only those items that satisfy a certain criterion to be purchased via the electronic shopping cart.*

75. *The method of claim 1 wherein each electronic shopping cart corresponds to a different role of the user when conducting electronic commerce.*

76. *The method of claim 75 wherein the different roles include a workplace role and a personal role.*

77. *The method of claim 75 wherein each electronic shopping cart is named with a name that is suggestive of its role.*

78. *The method of claim 1 including tracking searches input to a search engine and storing activity information relating to the searches in association with the currently selected electronic shopping cart.*

79. *The method of claim 78 wherein the activity information indicates documents in which the user has expressed an interest.*

80. *The method of claim 78 wherein different documents for the search are identified depending on the electronic shopping cart that is currently selected.*

81. *The method of claim 7 wherein when a current electronic commerce context is currently selected, the receiving from the user of a selection of one of the plurality of electronic commerce contexts causes switching from a currently selected electronic commerce context to a newly selected electronic commerce context.*

82. *The method of claim 7 wherein an electronic commerce context is independent of a shopping cart model.*

83. *The method of claim 7 including tracking electronic commerce activity while electronic commerce is conducted between the user and the vendor and wherein the associating includes storing activity information describing that the tracked electronic commerce activity occurred when the electronic commerce context was selected.*

84. *The method of claim 7 wherein the associated information is used to influence how the computer system inter-* acts with the user when the user subsequently selects that electronic commerce context.

85. The method of claim 7 wherein each electronic commerce context represents a shopping cart context from which items of the shopping cart can be purchased while in that shopping cart context.

86. The method of claim 7 wherein each electronic commerce context corresponds to a different role of the user when conducting electronic commerce.

87. The method of claim 86 wherein the different roles include a workplace role and a personal role.

88. The method of claim 86 wherein each electronic commerce context is named with a name that is suggestive of its role.

89. The method of claim 7 including tracking searches input to a search engine and storing activity information relating to the searches in association with the currently selected electronic commerce context.

90. The method of claim 89 wherein the activity information indicates documents in which the user has expressed an interest.

91. The method of claim 89 wherein different documents for the search are identified depending on the electronic commerce context that is currently selected.

92. The method of claim 7 including tracking web sites visited and storing activity information relating to the visited web sites in association with the currently selected electronic commerce context.

93. The method of claim 7 including presenting to the user an advertisement for an item based on previous electronic commerce conducted while in the currently selected electronic commerce context.

94. The computer system of claim 33 wherein when an electronic commerce context is currently selected, the component that receives from the user a selection of one of the plurality of electronic commerce contexts causes switching from a currently selected electronic commerce context to a newly selected electronic commerce context.

95. The computer system of claim 33 wherein the electronic commerce context is independent of a shopping cart model.

96. The computer system of claim 33 including a component that tracks electronic commerce activity while electronic commerce is conducted between the user and the vendor and wherein the stored information is activity information that describes that the tracked electronic commerce activity occurred when the electronic commerce context was selected.

97. The computer system of claim 33 wherein the stored information is used to influence how the computer system interacts with the user when the user subsequently selects the selected electronic commerce context.

98. The computer system of claim 33 wherein each electronic commerce context represents a shopping cart context from which items of an electronic shopping cart can be purchased while in that shopping cart context.

99. The computer system of claim 33 wherein each electronic commerce context corresponds to a different role of the user when conducting electronic commerce.

100. The computer system of claim 99 wherein the different roles include a workplace role and a personal role.

101. The computer system of claim 99 wherein each electronic commerce context is named with a name that is suggestive of its role.

102. The computer system of claim 33 including a component that tracks searches input to a search engine by the user and storing activity information relating to the searches in association with the currently selected electronic commerce context.

103. The computer system of claim 102 wherein the activity information indicates documents in which the user has expressed an interest.

104. The computer system of claim 103 wherein different documents for the search are identified depending on the electronic commerce context that is currently selected.

105. The computer system of claim 33 including a component that tracks web sites visited and storing activity information relating to the visited web sites in association with the currently selected electronic commerce context.

106. The computer system of claim 33 including a component that presents to the user an advertisement for an item based on previous electronic commerce conducted while in the currently selected electronic commerce context.

107. A method in a computer system for interacting with a user, the method comprising:

receiving from the user a selection of one of a plurality of interaction contexts;

after receiving the selection of an interaction context, interacting with the user; and associating the interacting with the selected interaction context wherein the user provides at least one of the interaction contexts and wherein the interacting associated with the selected interaction context can be used to customize interactions with the user when the user subsequently selects that interaction context;

wherein the interacting includes selecting items and the associating includes storing the identity of the items selected and further comprising presenting to another user a recommendation for an item based on items associated with a certain interaction context.

108. The method of claim 107 wherein the other user selects the recommended item as a gift for the user.

109. A method in a computer system for interacting with a user, the method comprising:

receiving from the user a selection of one of a plurality of interaction contexts;

after receiving the selection of an interaction context, interacting with the user; and associating the interacting with the selected interaction context wherein the user provides at least one of the interaction contexts and wherein the interacting associated with the selected interaction context can be used to customize interactions with the user when the user subsequently selects that interaction context;

wherein the interacting includes selecting items and the associating includes storing the identity of the items selected and further comprising providing to another user a list of items associated with one of the interaction contexts.

110. The method of claim 109 wherein the other user purchases one of the items in the list as a gift for the user.

111. The method of claim 110 wherein the purchased gift is shipped to the user in accordance with shipment information of the associated interaction context.

112. A method in a computer system for interacting with a user, the method comprising:

receiving from the user a selection of one of a plurality of interaction contexts;

after receiving the selection of an interaction context, interacting with the user; and associating the interacting with the selected interaction context wherein the user provides at least one of the interaction contexts and wherein the interacting associated with the selected interaction context can be used to customize interactions with the user when the user subsequently selects that interaction context;

wherein the user indicates that another user can access information associated with an interaction context.

113. A method in a computer system for interacting with a user, the method comprising:

receiving from the user a selection of one of a plurality of interaction contexts;

after receiving the selection of an interaction context, interacting with the user; and associating the interacting with the selected interaction context wherein the user provides at least one of the interaction contexts and wherein the interacting associated with the selected interaction context can be used to customize interactions with the user when the user subsequently selects that interaction context;

wherein the interaction context is an electronic commerce context and including limiting the electronic commerce conducted while an electronic commerce context is selected to a specified scope for that electronic commerce context;

wherein the scope is specified by a filter that is applied when electronic commerce is conducted while that electronic commerce context is selected.

114. A method in a computer system for interacting with a user, the method comprising:

receiving from the user a selection of one of a plurality of interaction contexts;

after receiving the selection of an interaction context, interacting with the user; and associating the interacting with the selected interaction context wherein the user provides at least one of the interaction contexts and wherein the interacting associated with the selected interaction context can be used to customize interactions with the user when the user subsequently selects that interaction context;

wherein the interaction context is an electronic commerce context and including limiting the electronic commerce conducted while an electronic commerce context is selected to a specified scope for that electronic commerce context;

wherein the limiting includes displaying only those items that satisfy a certain criterion associated with the electronic commerce context.

115. A method in a computer system for interacting with a user, the method comprising:

receiving from the user a selection of one of a plurality of interaction contexts;

after receiving the selection of an interaction context, interacting with the user; and associating the interacting with the selected interaction context wherein the user provides at least one of the interaction contexts and wherein the interacting associated with the selected interaction context can be used to customize interactions with the user when the user subsequently selects that interaction context;

wherein the interaction context is an electronic commerce context and including limiting the electronic commerce conducted while an electronic commerce context is selected to a specified scope for that electronic commerce context;

wherein the limiting includes allowing purchase of only those items that satisfy a certain criterion associated with the electronic commerce context.

116. A method in a computer system for interacting with a user, the method comprising:

receiving from the user a selection of one of a plurality of interaction contexts;

after receiving the selection of an interaction context, interacting with the user; and associating the interacting with the selected interaction context wherein the user provides at least one of the interaction contexts and wherein the interacting associated with the selected interaction context can be used to customize interactions with the user when the user subsequently selects that interaction context;

wherein the receiving of a selection includes sending to the user an indication of each of the plurality of interaction contexts.

117. The method of claim 116 wherein the sent indications are to be displayed simultaneously to the user for selection of one of the indications.

118. A method in a computer system for interacting with a user, the method comprising:

receiving from the user a selection of one of a plurality of interaction contexts;

after receiving the selection of an interaction context, interacting with the user; and associating the interacting with the selected interaction context wherein the user provides at least one of the interaction contexts and wherein the interacting associated with the selected interaction context can be used to customize interactions with the user when the user subsequently selects that interaction context;

wherein the interacting includes receiving searches in input to a search engine and the associating includes associating activity information relating to the searches with the currently selected interaction context.

119. The method of claim 118 wherein the activity information indicates documents in which the user has expressed an interest.

120. The method of claim 119 wherein different documents for a search are identified depending on the interaction context that is currently selected.

121. A method in a computer system for interacting with a user, the method comprising:

receiving from the user a selection of one of a plurality of interaction contexts;

after receiving the selection of an interaction context, interacting with the user; and associating the interacting with the selected interaction context wherein the user provides at least one of the interaction contexts and wherein the interacting associated with the selected interaction context can be used to customize interactions with the user when the user subsequently selects that interaction context;

wherein when an interaction context is currently selected, the receiving from the user of a selection of one of the plurality of interaction contexts causes switching from a currently selected interaction context to a newly selected interaction context.

122. A method in a computer system for interacting with a user, the method comprising:

receiving from the user a selection of one of a plurality of interaction contexts;

after receiving the selection of an interaction context, interacting with the user; and associating the interacting with the selected interaction context wherein the user provides at least one of the interaction contexts and wherein the interacting associated with the selected interaction context can be used to customize interactions with the user when the user subsequently selects that interaction context;

wherein each interaction context represents a shopping cart context from which items of an electronic shopping cart can be purchased while in that shopping cart context.

* * * * *